Patented Oct. 4, 1949

2,483,447

UNITED STATES PATENT OFFICE 2,483,447

AMINOMERCAPTOBENZENESULFONAMIDES

William Howells Vinton, Wilmington, Del., assignor to E. I. du Pont de Nemours & Company, Wilmington, Del., a corporation of Delaware No Drawing. Application January 17, 1946, Serial No. 641,861

4 Claims. (Cl. 260—397.7)

This invention relates to substituted sulfanilamides, and more particularly to aminobenzenesulfonamides having thiol groups attached to the benzene nucleus. It also relates to a process for their preparation.

p-Aminobenzenesulfonamide and its derivatives having various substituent groups attached to either the amino or the amido nitrogen atoms are members of the group of therapeutic agents known widely as "sulfa" drugs. These compounds are particularly effective in certain therapeutic applications. However, they are not effective in some applications for which an improved therapeutic agent is desired.

An object of the present invention is to provide the hitherto unknown class of compounds, viz., mercaptosulfanilamides. Another object is to provide new derivatives of sulfanilamides having useful therapeutic properties. A still further object is to provide a process for preparing such compounds. Other objects will appear hereinafter.

These objects are accomplished by the present invention of mercaptosulfanilamides and the process for preparing them described below. These mercaptosulfanilamides, having a thiol group attached to the benzene nucleus, include mercaptoaminobenzenesulfonamides and their derivatives having substituent groups on the amino or amido nitrogen atoms. A desirable group of this new class is that of para-aminobenzenesulfonamides having a mercapto group as the only substituent, other than the amino and sulfonamido groups, on the benzene ring. A particularly useful group is that wherein the mercapto, amino and sulfonamido groups are the only substituents on the benzene ring and the nitrogen atom of the sulfonamido group is joined to a carbon which is doubly bonded to a tervalent imido nitrogen atom.

The preparation of mercaptosulfanilamides by the process of this invention involves hydrogenating a 4-amino-benzenesulfonamide disulfide in the presence of a sulfactive catalyst. In a preferred form of the invention the amino-benzenesulfonamide disulfide is hydrogenated in the presence of a ruthenium dioxide catalyst at a temperature of 50 to 100° C. and at a pressure of about 3 atmospheres.

The invention is illustrated in greater detail by the following example in which the proportions of reactants are expressed as parts by weight.

Example

Ten (10) parts of 3,3'-dithiobis(4-aminobenzenesulfonamide), which can be prepared from p-aminobenzenesulfonamide by the procedures described by Kaufmann and Buckmann in Arch. Pharm. 279, 202 (1941), is suspended in 155 parts of purified dioxane and 0.05 part of ruthenium dioxide catalyst added thereto. This mixture is placed in a container capable of withstanding moderate pressures and shaken for about 20 hours at a temperature of 75° C. under a hydrogen pressure of 40 lb./sq. in. While still hot, the reaction mixture is removed and filtered to separate the catalyst, this and all subsequent operations being carried out under an atmosphere of oxygen-free nitrogen. The dioxane is removed from the filtered, dark-colored solution by evaporation under reduced pressure. The resulting greenish-colored solid is leached with three portions, 250 parts each, of boiling deoxidized monochlorobenzene, after which the combined extracts are placed in a closed container and cooled in an ice bath for 2 hours. The precipitate which forms is removed by filtration, washed thoroughly with petroleum ether, and, after drying, stored under nitrogen in a closed container. A yield of 6.0 parts, corresponding to 60% of theory, of 3-mercapto-4-aminobenzenesulfonamide is obtained, the material being in the form of essentially colorless needles having a melting point of 133–136° C. and a thiol sulfur content corresponding to 99+% of theory. Analysis: Calculated for $C_6H_8N_2S_2O_2$: N, 13.73%. Found: N (Kjeldahl), 13.69, 13.98%.

The invention has been illustrated with particular reference to the preparation of 3-mercapto-4-aminobenzenesulfonamide; however, other mercaptosulfanilamides may be produced by the hydrogenation of the disulfides of analogs of sulfanilamide, i. e. disulfides of aminobenzenesulfonamides having various substituent groups attached to the amino or amido nitrogen atoms. Specific examples of these include the disulfides of sulfathiazole, sulfapyridine, sulfadiazine, sulfamerazine, sulfaguanidine, sulfacetamide, succinylsulfathiazole, sulfapyrazine, sulfamethazine, and sulfamethylthiazole.

Ruthenium catalysts other than the dioxide of the example may also be used in the process of this invention, examples of such being elementary ruthenium, other ruthenium compounds, reducible to ruthenium such as the oxides, and reducible ruthenium salts such as ruthenium trichloride.

Sulfactive catalysts other than the ruthenium dioxide of the example can also be used in the process of this invention. By the term "sulfactive catalyst" as used herein and in the claims is meant a catalyst which is active for the catalytic hydrogenation of the sulfur in organic multisulfides, organic sulfur compounds having sulfur-to-oxygen unsaturation, and organic sulfur compounds having carbon-to-sulfur unsaturation. Metallic ruthenium or any compound of ruthenium reducible to metallic ruthenium under the conditions of reaction, e. g., other ruthenium oxides and salts such as ruthenium trichloride, are the preferred catalysts. However, other types of sulfactive catalysts may be used. Specific examples of other sulfactive catalysts include the sulfides of the base metals, e. g., sulfides of chromium, cobalt, copper, iron, lead, molybdenum, nickel, tin, tungsten, and vanadium. Such sulfide catalysts may be prepared by a variety of methods, for example, by the processes described in U. S. Patents 2,221,804 and 2,230,390 and in the copending applications of F. K. Signaigo, Ser. No. 319,241, now Patent No. 2,402,683, filed February 16, 1940, and Ser. No. 319,242, now Patent No. 2,402,684, filed February 16, 1940, and the copending application of B. W. Howk, Ser. No. 353,936, now Patent No. 2,402,626, filed August 23, 1940. When the base metal sulfide catalysts are used, however, the temperatures and pressures required are higher, e. g., temperatures up to 140° C. and pressures up to 100 atmospheres, than when ruthenium catalysts are used, and the yields are not as good. The proportions of catalysts employed may be varied considerably. Usually the amount will vary from 0.1% to 10% by weight of the sulfanilamide disulfide employed. In general, higher proportions of catalysts produce an increase in the rate of hydrogenation. The catalyst used in this process may be supported on an inert material such as finely divided kieselguhr, silica or other catalyst supports known to the art.

As indicated above, the hydrogenation of disulfides of sulfanilamides in the presence of ruthenium catalysts takes place at relatively low temperatures and pressures, a pressure of about 3 atmospheres and temperatures of about 50–100° C. being preferred. Still lower temperatures and pressures, e. g. 25 to 50° C. and pressures of 1 to 3 atmospheres, may be used, but these are less desirable because of the increased reaction times which are required. Higher temperatures tend to cause decomposition of the products. Higher pressures may be used, the only upper limit being the maximum permitted by the structural limitations of the equipment employed. In any particular case the lowest temperature and pressure required to effect hydrogenation at a practical rate is employed for economical reasons.

Examples of other solvents which may be used in place of the dioxane of the example include alcohols such as ethyl alcohol and cyclohexanol, ethers such as dibutyl ether, and hydrocarbons such as benzene.

The mercaptosulfanilamides of this invention are particularly useful as therapeutic agents. The process of this invention provides a simple method for obtaining the hitherto unknown mercaptosulfanilamides.

The foregoing detailed description has been given for clearness of understanding only and no unnecessary limitations should be understood therefrom since obvious modifications will occur to a person skilled in the art.

What is claimed is:

1. 4 - Amino - 3-mercaptobenzenesulfonamide.

2. Process of preparing 3-mercapto-4-aminobenzenesulfonamide which comprises hydrogenating 3,3' - dithio-bis(4 - aminobenzenesulfonamide) in the presence of ruthenium dioxide catalyst at a hydrogen pressure of about 40 lbs. per sq. in. and a temperature of about 75° C.

3. Process of preparing 3-mercapto-4-aminobenzenesulfonamide which comprises hydrogenating 3,3' - dithio-bis(4 - aminobenzenesulfonamide) at a hydrogen pressure of about 3 atmospheres and a temperature of 50–100° C. in the presence of a ruthenium dioxide hydrogenating catalyst.

4. Process of preparing 3-mercapto-4-aminobenzenesulfonamide which comprises hydrogenating 3,3'-dithio-bis(4 - aminobenzenesulfonamide) at a hydrogen pressure of about 1 to 100 atmospheres and a temperature of 50–100° C. in the presence of a ruthenium dioxide hydrogenating catalyst.

WILLIAM HOWELLS VINTON.

REFERENCES CITED

The following references are of record in the file of this patent:

UNITED STATES PATENTS

| Number | Name | Date |
|---|---|---|
| 2,356,265 | Northey | Aug. 22, 1944 |
| 2,402,686 | Signaigo | June 25, 1946 |

FOREIGN PATENTS

| Number | Country | Date |
|---|---|---|
| 364,408 | Italy | Nov. 3, 1938 |